United States Patent [19] [11] 3,783,397
Dishal et al. [45] Jan. 1, 1974

[54] SELECTION AND PROCESSING SYSTEM FOR SIGNALS, INCLUDING FREQUENCY DISCRIMINATOR

[75] Inventors: Milton Dishal, Upper Montclair; Henri Baran, Parsippany, both of N.J.

[73] Assignee: International Telephone and Telegraph Corporation, Nutley, N.J.

[22] Filed: June 14, 1971

[21] Appl. No.: 153,087

Related U.S. Application Data

[62] Division of Ser. No. 763,225, Sept. 27, 1968.

[52] U.S. Cl. .................. 329/110, 329/122, 329/145
[51] Int. Cl. .......................................... H03d 3/24
[58] Field of Search .................... 329/110, 112, 122, 329/126, 145, 146; 307/233; 325/346, 345, 349

[56] References Cited

UNITED STATES PATENTS

| | | | |
|---|---|---|---|
| 3,124,751 | 3/1964 | Grey | 325/346 X |
| 3,562,675 | 2/1971 | Urell | 307/233 X |
| 3,242,435 | 3/1966 | Malnar et al. | 329/145 X |
| 3,142,062 | 7/1964 | Held | 307/233 X |
| 3,324,397 | 6/1967 | Harvey | 329/112 X |
| 2,922,040 | 1/1960 | Browder | 329/112 |
| 3,209,271 | 9/1965 | Smith | 329/122 |

*Primary Examiner*—Alfred L. Brody
*Attorney*—Alfred C. Hill

[57] ABSTRACT

A signal selection and processing system for use with a broadband LORAN receiver in which the average of the strongest interfering signal having a predetermined duty cycle sets the AGC level and, via a special frequency discriminator, controls the frequency of a voltage controlled oscillator (VCO). The VCO output is used to shift the entire band of input frequencies so that said strongest signals fall into the attenuating notch of a notch filter while passing the other signals to the LORAN receiver.

In said discriminator, signals are transmitted through one channel in which a certain phase shift is produced and a second channel which also produces the same phase shift plus an additional phase shift which varies 180° over the band of interest. Gating pulses are derived from the phase shifted signals in the second channel and gate out different portions of tbe signals in the first channel so that the output pulses are of different amplitude and polarity, depending on the input frequency. These output pulses are applied to an integrating network arranged to maintain its charge in the absence of an input signal. The integrated voltage controls the VCO frequency. Frequency search and lock-on are accomplished by switching broadband and narrow band phase shifting filters and varying the gain in the first channel to maintain stability. Up-and-down frequency conversions in said second channel are effected by said VCO. In another embodiment a single frequency conversion for both channels is employed.

9 Claims, 5 Drawing Figures

SELECTION AND PROCESSING SYSTEM FOR SIGNALS, INCLUDING FREQUENCY DISCRIMINATOR

CROSS-REFERENCE TO RELATED APPLICATION

This application is a division of an earlier copending application Ser. No. 763,225, filed Sept. 27, 1968.

FIELD OF INVENTION

This invention relates to a selection and processing system for signals and to a frequency discriminator particularly useful therein.

DESCRIPTION OF THE PRIOR ART

In certain receiving systems whose input tuning is necessarily broadband, such as LORAN (where narrow band input tuning would result in an unacceptable distortion of the characteristics of the LORAN pulses on which accurate navigational readings depend), there is the difficult problem of coping with those unwanted signals within the broadband whose amplitude is commensurate with that of the desired LORAN pulses. In one previous LORAN receiving system in processing the broadband input, use is made of a tunable notch filter manually tuned so that an unwanted signal coincides with the notch in the filter and accordingly is attenuated, while other frequencies in the broadband are passed by the filter with minimum attenuation. Two or more of such tunable notch filters in tandem may serve to eliminate the most objectionable interfering signals. However, the tuning of such filters places the onus, on operators of the equipment, of finding the objectionable signals and tuning the filter accurately to attenuate them. This task becomes more difficult in the case of interrupted or intermittent signals (i.e. on and off signals of the A1 type).

For automatically tuning the notch filter, or more accurately, for automatically tuning the interfering signal to fit the notch filter, the use of a local oscillator controlled by a frequency discriminator responsive to the offending signals is herein described, but the conventional frequency discriminator will not suffice in this and in many other situations where the incoming signal is intermittent or interrupted, for the output voltage of the conventional discriminator changes during the interruptions in the signal, and the local oscillator frequency controlled by such discriminator either drifts or settles at an average frequency offset from the required frequency.

SUMMARY OF THE INVENTION

An object of the present invention is the provision of an improved rpocessing system for signals, particularly one that provides for automatic signal selection.

Another object of the present invention is the provision of an improved automatic signal selection system.

A further object of the present invention is the provision of an improved frequency discriminator, which may be used in said selection and processing systems and is particularly adapted for use with intermittent or interrupted signals.

According to one aspect of the present invention there is provided means, coupled to a source of signals within a given requency band for varying the frequency of an oscillator so that its frequency bears a predetermined relationship to a selected signal within said band. The oscillator frequency is then used to convert the frequency of the selected signal so that it is shifted to a specified frequency within the band of a signal processor to which said selected signal is applied. At this specific frequency the processor operates on the signal in a unique way.

According to another aspect of the present invention there is provided a signal selection system in which amplitude control means bring the amplitude of the strongest input signal having at least a given duty cycle to a standard level above the level of the lower amplitude incoming signals. The signals are applied to a frequency discriminator which discriminator provides two paths in one of which there is a phase shift additional to the phase shift in the other path which additional phase shift varies with variations of the frequency of the input signal, this additional phase shift being provided by at least two filters, one broad enough to cover the entire frequency range of the signals and another having narrower passband characteristics, the broadband filter being switched out when the output of the narrower band filter exceeds a predetermined threshold level. A voltage is produced that varies with variations in phase of the signals at the output of said paths, the voltage in turn varying the frequency of an oscillator. A frequency converter, whose inputs are coupled to the oscillator and the amplitude control means, has its output connected to at least the first of said paths.

According to a further aspect of the present invention a frequency discriminator has a pair of transmission paths for input signals within a specified frequency band, one path providing a substantially constant phase shift over said band, the other providing a phase shift that varies with variations of the input signal frequency over said band. Means in one of said paths produces gating pulses each coinciding with a predetermined portion of each cycle of the signals in said one path. Gating means at the output of the other of said paths and responsive to the gating pulses in said one path, transmits portions of the signals at the output of said other path which are coincidental with said gating pulses. Means responsive to said transmitted portions develops an output voltage which varies with variations in the amplitude of the transmitted portions, and is a function of the relative phases of the signals at the outputs of said paths.

Other and further objects of the present invention will become apparent and the foregoing will be best understood with reference to the following drawings in which.

GENERAL DESCRIPTION

Figure 1:
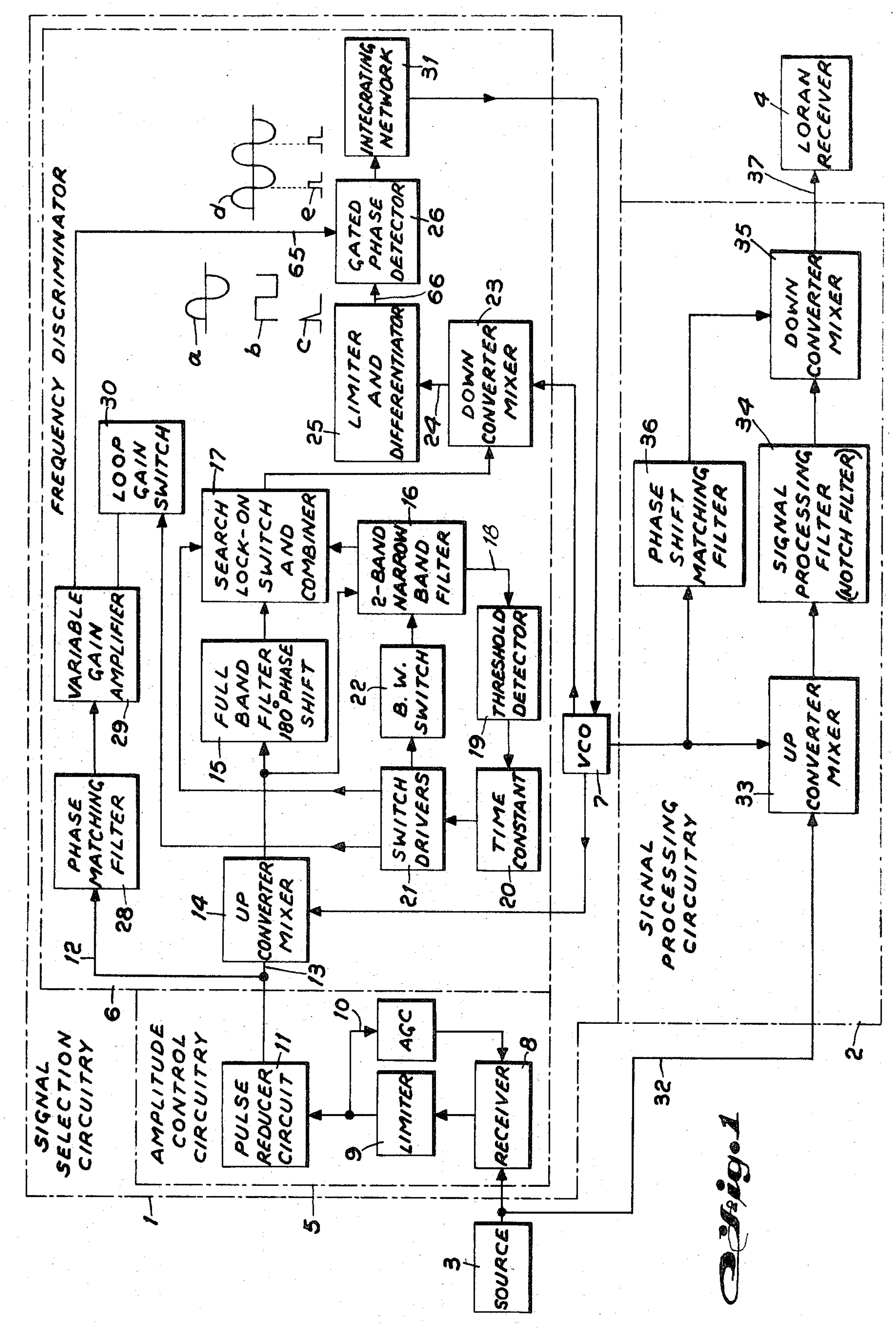
FIG. 1 is a block diagram of a preferred embodiment of the present invention illustrating an automatic signal seeking notch filter system for association with a LORAN recevier.

Referring now to FIG. 1, the system there illustrated may be considered as composed of two main subsystems: signal selection circuitry 1, and signal processing circuitry 2. A broadband source of signals 3 of sufficient bandwidth to allow the reception of LORAN pulses without significant distortion supplies the LORAN pulses as well as undesired other signals falling within said band to both said subsystems.

The signal selection circuitry 1 responds to the strongest signal whose duty cycle exceeds a predetermined value (therefore excluding the desired LORAN pulse and other pulse signals having similar characteristics of low duty cycle), and generates a wave whose frequency is offset from that of said strongest signal by a predetermined amount. This wave is applied in the signal processing circuitry 2 to shift the frequency of all the signals received within the aforesaid broadband so that said strongest signal (other than the LORAN and similar pulses) is shifted to a special frequency within the band of a signal processor or signal processing component, wherein it is operated on, e.g., by the attenuating notch of a notch filter. The resultant output signals, with the strongest interfering signal attenuated, are then fed directly to a LORAN receiver 4, or through another signal selection and processing system as aforedescribed which eliminates the next strongest signal, to the LORAN receiver. It is obvious that additional selection and processing systems of this type may be added in tandem to those heretofore described as deemed desirable.

DETAILED DESCRIPTION

Signal Seeking or Selection Circuitry

The signals from source 3 are broadband, e.g. covering a 2:1 frequency ratio. Within this specified rf bandwidth may be simultaneously found a variety of different signals such as CW, A1 (i.e. on-off keying), F1 (i.e. FSK), as well as LORAN and other short pulse signals. The siganl seeking circuitry 1 must accomplish the end result of locking on to the strongest of the signals (not including the LORAN pulses and the other pulse siganls having a low duty cycle) and then controlling the frequency of a voltage controlled oscillator so that it is offset from this locked-on-to signal by a predetermined amount.

The signal seeking circuitry consists of amplitude control circuitry 5, a frequency discriminator 6, and a voltage controlled oscillator 7.

Referring now to the amplitude control circuitry 5, the source 3 is connected to a receiver 8 which is a full-band high gain RF amplifier consisting of a number of amplifier stages and incorporating therein instantaneous, symmetrical limiters which keep strong overloading pulses from desensitizing the receiver (except, of course, during the actual pulse duration). Furthermore, there is provided a final limiter 9 followed by an AGC feedback circuit 10 which controls the gain of receiver 8. The final limiter 9 has its limiting level set just above the standard AGC output level so that the AGC circuit can still correctly function. This limiter performs two functions: it keeps strong pulse siganls from markedly affecting the standard level to which the AGC must set the strongest average signal (CW, A1, or F1), and it sets a constant limited pulse level which will be fed to the following pulse reducer circuit 11 more fully described in FIG. 2. This circuit 11 substantially reduces the amplitude of pulses so that they fall far below the standard AGC output level. The standard level set by the AGC passes unattenuated, as is explained in connection with FIG. 2.

The AGC circuit 10 is actuated by the average level of the total signal fed to it. The average level of an on-off modulated carrier is a direct function of the duty cycle of the modulation which, in practice, can vary from approximately 50 percent for A1 types of transmission to less than 1 percent, for example, for so-called pulse types of transmission. As the duty cycle of this type of pulse gets less and less, more and more of the instantaneous level of such pulses will exceed this average and more and more of the signal reaches the limiter and reducer circuit threshold and is attentuated. Thus, by adjusting the AGC level in relation to the limiter-reducer threshold, the combination is so designed that for signals with a duty cycle less than the specified amount, e.g. LORAN C and LORAN D signals, negligible resultant signal will be passed on to the following discriminator circuit; whereas for signals having duty cycles greater than this specified amount, essentially full standard level will be passed on to the discriminator circuit 6. This adjustment should preferably be made with a total real life, band of signals being fed to the circuit.

The signals from the output of the pulse reducer circuit 11 are fed to the discriminator 6.

FREQUENCY DISCRIMINATOR

If only CW or FSK types of interfering signals were to be handled, the very important discriminator circuit 6 could have used a conventional type of circuit such as the Round-Travis circuit or the Foster-Seeley circuit. However, in both these well known discriminator circuits when the signal is removed, the detected output voltage decays to zero. Thus, if a captured signal were turned off for a short interval, the voltage controlled oscillator (VCO) 7 controlled by such a discriminator would drift away from the correct frequency to which it is set when this signal is being received. Thus, the conventional circuits cannot be used to maintain lock-on when on-off keying, i.e. so-called Al, types of transmission must be dealt with. The discriminator circuit 6 shown is a gated or keyed type of circuit which at its detector output terminals becomes an actual open circuit when no signals are being received. Thus, this discriminator does not cause its output voltage to decay towards zero during the "off" condition of the on-off keying signal.

The foregoing will be clearer if we examine the circuit in detail.

In broad outline, the signals from the pulse reducer circuit 11 are fed in frequency discriminator 6 through two paths 12 and 13. In path 12 there is some phase shift over the entire frequency band in question while path 13 provides a phase shift equal to that of path 12, plus an additional phase shift that varies 180° over the entire frequency band. Pulses are derived from the signals in the second path which pulses likewise vary in timing or phase depending upon the input frequency. These pulses are used to gate on (transmit) time coincidental portions of the signal at the output of path 12 so that the transmitted portions vary in amplitude in accordance with the frequency of the input signal. These variable amplitude portions are integrated to provide a d.c. voltage which is then used to control the frequency of the voltage controlled oscillator 7.

Figure 3:
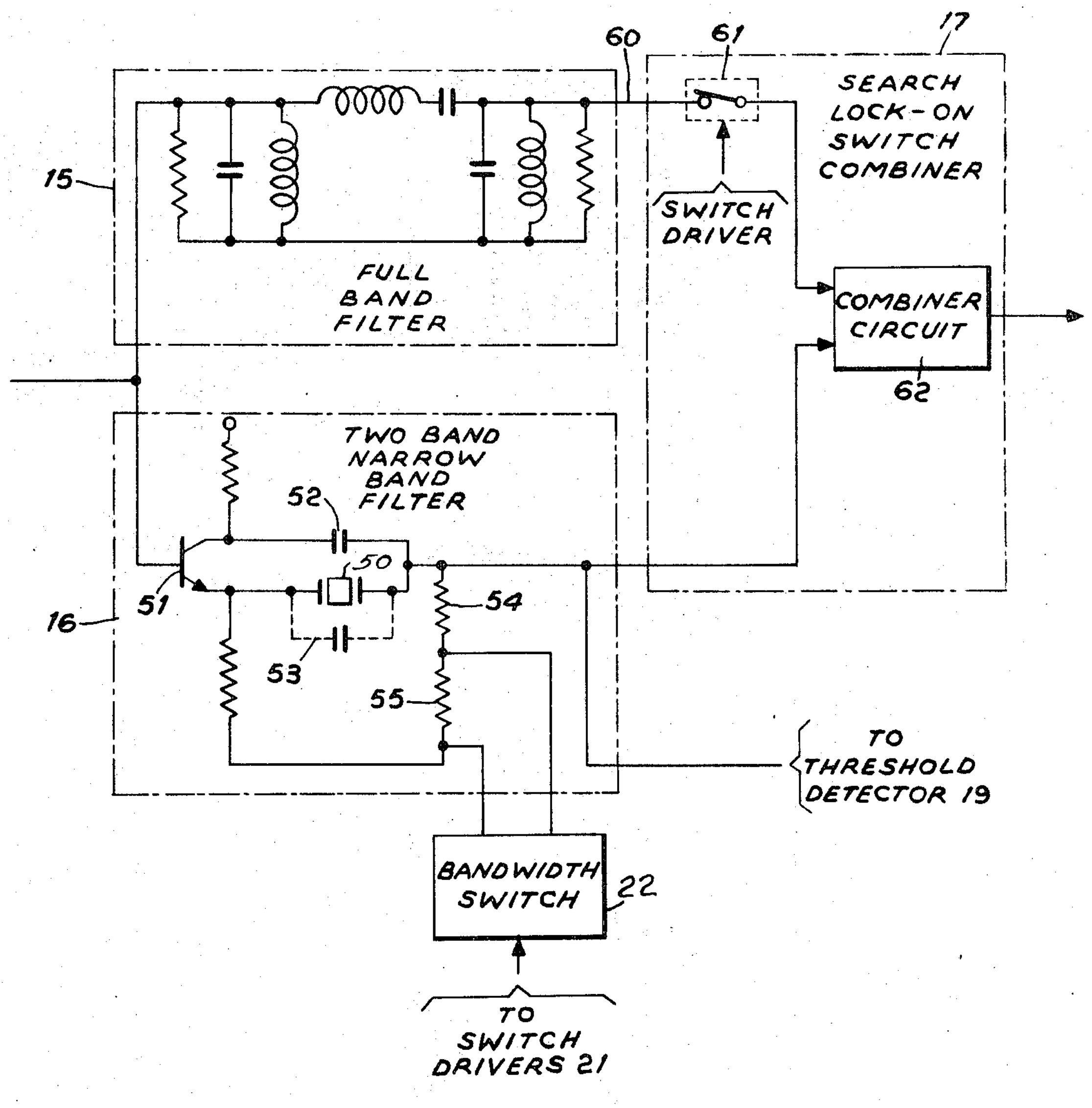
FIG. 3 is a schematic and block diagram of the two filters and the search lock-on switch and combiner in the frequency discriminator illustrated in FIG. 1.

Referring now to the specific details of the discriminator, the input signal to the frequency discriminator 6 is fed along path 13 first to an up-converter mixer 14, where it is mixed with the signal from the VCO 7, and thence to a set of bandpass filters 15 and 16 (shown in detail in FIG. 3). Bandpass filter 15 passes the full band to be protected and has a phase characteristic which goes through approximately 180° of change over the band. Filter 16 is a two-band narrow band filter. It is a highly stable, switched bandwidth reference filter with a passband width which in one position is approximately ten to fifteen times wider than the desired accuracy of lock-on for the system, and in its other switched position has a passband width which is only three to four times wider than the desired accuracy of lock-on for the system. The phase characteristic of this filter goes through no more than 180° of change between its 30 db down frequencies in either bandwidth condition. The output of both filters 15 and 16 is combined in a switch-operated combiner 17 (shown in detail in FIG. 3) whose output is, in so-called search-mode, the sum of the transfer responses of the above two filters; or in so-called lock-on mode, is the output of only the highly stable reference filter in its narrowband condition (i.e. when the narrow-band filter is in its narrow passband state in which it is only three to four times wider than the desired accuracy of the lock-on for the system). Filters 15 and 16 and switch-operated combiner 17 are more fully described in FIG. 3.

To control the switching of the two-band narrow-band filter 16 and the combiner 17, an output is provided from the two-band narrow-band filter 16 along line 18 which is fed through a threshold detector 19. When the output of narrow-band filter 16 shows that a signal is inside the passband of this reference filter, the threshold detector 19 detects this signal and applies the output voltage to an integrating r-c network 20. When the voltage in 20 exceeds a predetermined level it operates the switch driver 21 (which is an amplifier), thereby switching combiner 17 from a search to a lock-on condition wherein output from full-band filter 15 is switched off and only the output of filter 16 is used. At the same time the switch driver 21 drives bandwidth switch 22 to switch the two-band narrow-band filter 16 into its narrow range from its medium range (see FIG. 3).

The output of combiner 17 is fed to a down-converter mixer 23 which is also fed by VCO 7 so as to bring the output frequency of the signal down to the same frequency fed into the up-converter mixer 14. The output of down-converter mixer 23 is fed to a limiter and differentiator 25 wherein the signal which may be sinusoidal in form as represented at "*a*," is limited to form a flat-top signal "*b*" which is differentiated and clipped so as to provide a pulse "*C*" substantially coinciding with the zero crossing of waveform *a*. Pulse *c* serves as a gating pulse for gating on (transmitting) portions of the signal *d* which is fed along path 12. When the frequency of the input to the discriminator is in the middle of the frequency range of the highly stable narrow-band filter 16, then pulse *c* would coincide with the positive-to-negative crossover point (or vice versa) of the waveform *d*. As the frqeuency of the signal fed to the input of the discriminator varies from the center of the band position, pulse *c* will coincide with different portions of waveform *d*. Thus, when pulse *c* is used to gate on (or transmit) portions of the waveform *d* in gated phase detector 26, the portions transmitted vary in amplitude in accordance with the frequency of the input signal to the frequency discriminator and may be positive or negative depending on the direction of deviation of said frequency from the center position. The gated phase detector 26, sometimes known as a strobe bridge, besides having the usual phase detector characteristic of giving a d.c. output proportional to the cosine of the phase angle between the two inputs, also has the important property of open-circuiting its output lead if one of the inputs is turned off. The output of the phase detector 26 is applied to an un-bypassed integrating network 31 so that the voltage on the network 31 is determined solely by the output of the gated phase detector 26. Therefore, as just pointed out, when the input to the gated phase detector is zero, the output of the gated phase detector is zero. Thus when there is an interruption in the input signals to the frequency discriminator, as in certain types of intermittent signals, the output of the gated phase detector 26 being open-circuited, the charge on network 31 remains constant and the voltage controlled oscillator 7, in turn controlled by the charge on network 31, remains constant.

It will be noted that path 13, in addition to the phase shift which varies 180° over the frequency band, also introduces excess phase characteristics. To compensate for these excess phase characteristics a phase matching filter 28 is provided in path 12 whose input is connected to the input of the discriminator and whose output is fed via variable gain amplifier 29 to the gated phase detector 26. Phase matching filter 28 passes the entire band of frequencies fed to it with a phase shift that matches the excess phase characteristics in path 13. Phase matching filter 28 may be a simple L-C low-pass filter.

It should be realized that instead of only one cleanly filtered signal, a whole band of frequencies containing many signals is fed to this system because of the broad-band characteristics of the input. Before lock-on to the strongest signal is accomplished, the combiner 17 adds the output of the full-band filter 15 to that of the highly stable reference filter 16 in its medium bandwidth condition, thus making the overall discriminator into a full-band discriminator with a very stable zero crossing due to this procedure of adding the highly stable reference filter phase characteristic to that of the full-band filter.

During search, the strongest standard level signal passed to the discriminator produces the maximum effect at the output of the discriminator, thus varying the frequency of the oscillator 7 so that the standard level signal is pulled towards the center of the passband of full-band filter 15 and into the operating range of the narrow-band filter 16 in its medium bandwidth condition.

However, if the system were left in this state, it would be found that many of the signals in the full-band which might be very close in level to the strongest signal would have the effect of pulling the system off the frequency of said strongest signal. Thus, as soon as the standard level signal is brought inside the passband of the highly stable reference filter in its medium bandwidth condition, the threshold detector circuit 19, the search lock-on switch driver 21 actuates the search lock-on switch so that the output of the converter 17 is only the output of the highly stable reference filter 16 and secondly it switches the filter 16 into its narrow-band condition. In this condition, only the one signal inside the passband of the narrow-band filter keys on the gated phase detector 26 and the other signals in the full band do not disturb the lock-on performance. At the same time, this bandwidth narrowing occurs, loop gain switch 30 is actuated by the switch driver 21 so as to reduce the gain in variable gain amplifier 29 so as to reduce the gain in path 12 in order to maintain the proper gain and phase margin for overall close loop stability.

It is to be noted that the output of filter 16 in its narrowband condition is the signal which is to be selected by the signal selection circuitry, i.e. "strongest signal" having a given duty cycle. Assuming that sometime later a second signal even stronger is being received, it would shift the AGC level so as to make the earlier "strongest signal" fall below the standard level. However, the earlier signal would still maintain control and lock-on as long as it exceeded the threshold level set by the threshold detector 19. This level may be set, for example so that the earlier signal, as it appears at the output of filter 16, must drop 6 db before it falls below the threshold level. When it does fall below this level for a sufficient time for the voltage on the r-c time constant circuit 20 to decay adequately, the search lock-on switch 17 and switch 22 go into their search position and the system then searches until it locks on to the frequency of the later "strongest signal."

It will, therefore, be seen that in referring in the specification and claims to the "substantially strongest" signal as being selected in the selection circuitry, we are excluding from this term signals having a lower average level (which includes pulses of higher amplitude but lower duty cycle so as to be below the average level) and also signals of slightly higher average level occurring when the system is locked-on to a prior "strongest signal" and the later slightly higher signal is not enough to cause the selection system to drop out of "lock-on."

SIGNAL PROCESSING CIRCUITRY

We have seen that the frequency of the voltage controlled oscillator 7 is offset from the frequency of the aforesaid strongest signal by a predetermined amount. As will be seen, this amount enables shifting the frequency of the strongest signal in the signal processing circuitry 2 to the frequency of the signal processor at which it is uniquely operated on, e.g. the notch or attenuation band of a notch filter. As is described above, this predetermined amount is accurately determined by the highly stable narrow-band filter.

Referring more specifically to said signal processing circuitry, the signals within the broad passband of source 3 are fed via line 32 and into the signal processing circuitry 2, to an up-converter mixer 33 where these signals are mixed with the output of voltage controlled oscillator 7. The output of up-converter mixer 33 is in turn fed to a signal processor which in this embodiment is a notch filter 34. The notch in said filter is narrow band and attenuates signals that fall within this notch while signals outside this notch are passed with minimum attenuation. The output of voltage controlled oscillator 7 varies in frequency with variations of the strongest signal but is accurately offset under the control of filter 16 so that the frequency of said strongest signal falls within the notch of notch filter 34 and is thereby attenuated. The remainder of signals are passed through filter 34 to a down converter 35 which is likewise fed with the output of voltage controlled oscillator 7 but which output is phase shifted in phase shift matching filter 36 so as to compensate for the phase shifting that occurs in the signal processing filter 34. The output of down converter 35 is thus restored to its original frequency band and is then fed via a line 37 to the LORAN receiver 4.

Where circumstances warrant, one or more signal seeking and processing systems can be interposed in tandem in line 37 between the LORAN receiver and the one just described so as to successively eliminate a number of such "strongest signals."

Figure 2:
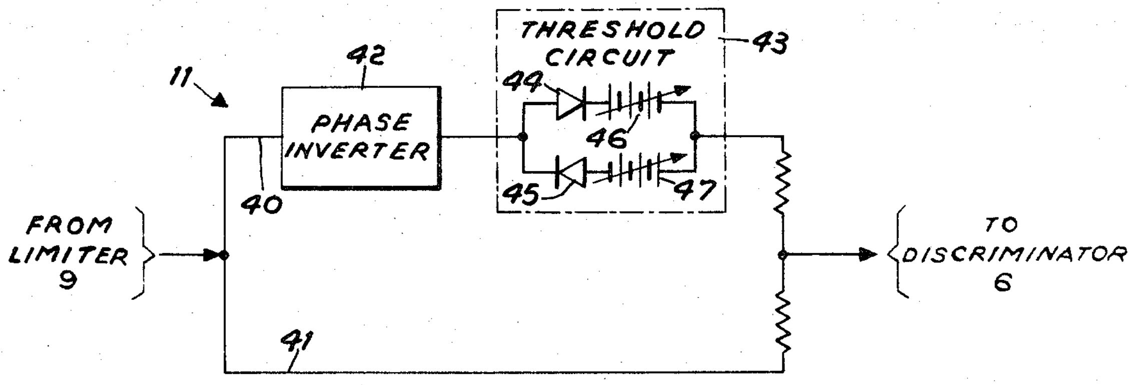
FIG. 2 is a schematic diagram of the pulse reducer illustrated in FIG. 1.

Referring now to FIG. 2, the pulse reducer circuit 11 of FIG. 1 is there illustrated and receives its signal from limiter 9 dividing it into two paths 40 and 41. In path 40 the signal is inverted in phase inverter 42 and then applied to a threshold circuir 43 which consists of two diodes 44 and 45 oppositely polarized with respect to the input and each back-biased by adjustable sources of potential 46 and 47 for setting the threshold level. The output of the threshold circuit 43 is then combined with the output of path 41 and the resultant signal is passed on to the frequency discriminator 6. It will be seen that the higher the amplitude of the input pulse, the more of it will be fed through the threshold limiter 43 and because of its inversion effectively subtracted from the amplitude of 41. Thus, the higher the amplitude of the input pulse the more will be subtracted from the output pulse and the more reduced the output pulse will be. The standard level set by the AGC system is below the threshold set by threshold circuit 43 and is passed unattenuated over path 41.

Referring now to the details of FIG. 3 and the components 15, 16 and 17, the full band filter 15 may be a triple tuned circuit or three-pole filter and one form of such filter is illustrated in FIG. 3. The two band narrow filter 16, also illustrated in FIG. 3, is a crystal filter using a crystal 50 fed from a transistor follower circuit 51, with a shunt capacitor 52 for cancelling the effect of the crystal capacity shown diagrammatically at 53. The Q and bandwidth of the crystal filter is affected by two resistors in series, resistor 54 and resistor 55. When the output signal on line 18 is high enough to pass through the threshold of threshold detector 19 (see FIG. 1) and operate the switch driver 21, bandwidth switch 22 is operated by switch driver 21 and shorts resistor 55 thereby increasing the Q of the crystal filter and narrowing its bandwidth.

Referring back to FIG. 3, during the search phase, the output of filter 15 is fed via line 60 to the switch 61 in the search lock-on switch combiner 17 and through the switch to a combiner circuit 62 where it is combined with the output of filter 16. However, when the switch driver circuit actuates switch 61, then the normally closed switch 61 is opened and only the output of filter 16 is fed to the combiner circuit 62. In actual practice switch 61 is an electronic switch, not a mechanical one as depicted.

Figure 4:
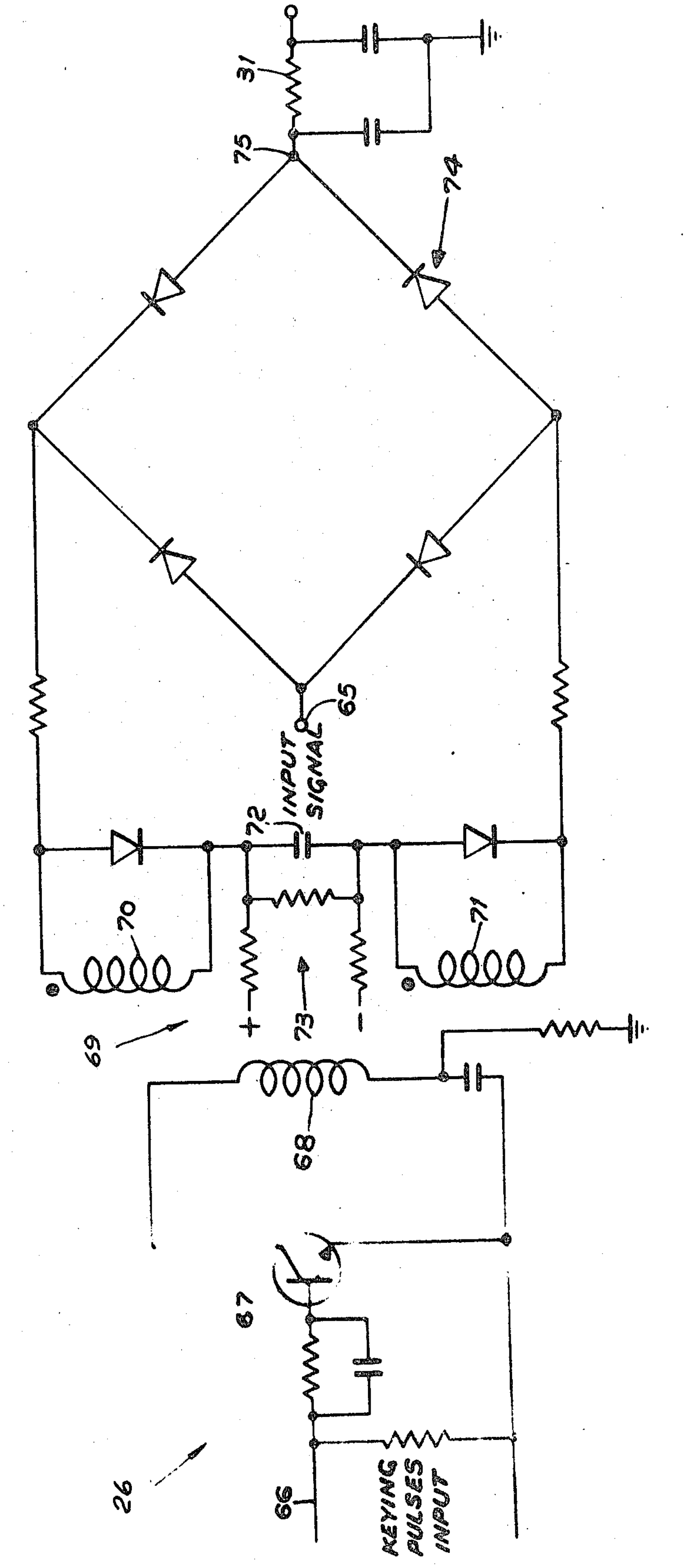
FIG. 4 is a schematic diagram of the gated phase detector described in FIG. 1.

Referring now to FIG. 4, which shows the gated phase detector 26 in detail, the keying pulse input from line 66 of transmission path 13 (FIG. 1) is applied to a driver transistor 67 and thence to the primary 68 of a transformer 69 having a split secondary consisting of two coils 70 and 71. Between the two coils there is provided a d.c. blocking condenser 72 across opposite sides of which there are applied biasing voltages from a source 73 which voltages in turn appear across the arms of a diode bridge 74 so as to block conduction in these four diodes except at the time when an input pulse is applied to the input 66 of this circuit. The input signals from the output 65 of path 12 are applied to one of the diagonals of the bridge and the output is derived from the opposite diagonal point 75 when the bridge is unblocked by a gated pulse applied to the input line 66 of this circuit. The output obtained at terminal 75 of the bridge is integrated in the integrating network 31.

It will be noted that the voltage developed in the integrating network 31 does not vary in the absence of an input pulse at input line 66 because the bridge 74 is substantially an open circuit in the absence of such a pulse. This circuit also satisfies the necessary requirement that the gating pulses do not appear at the output. Therefore, in the absence of an input signal at 66 the voltage on the integrating network will not decay and, therefore, as will be evident from examining its relationship to the voltage controlled oscillator 7 of FIG. 1, this voltage controlled oscillator will be maintained constant in the absence of an input signal.

Figure 5:
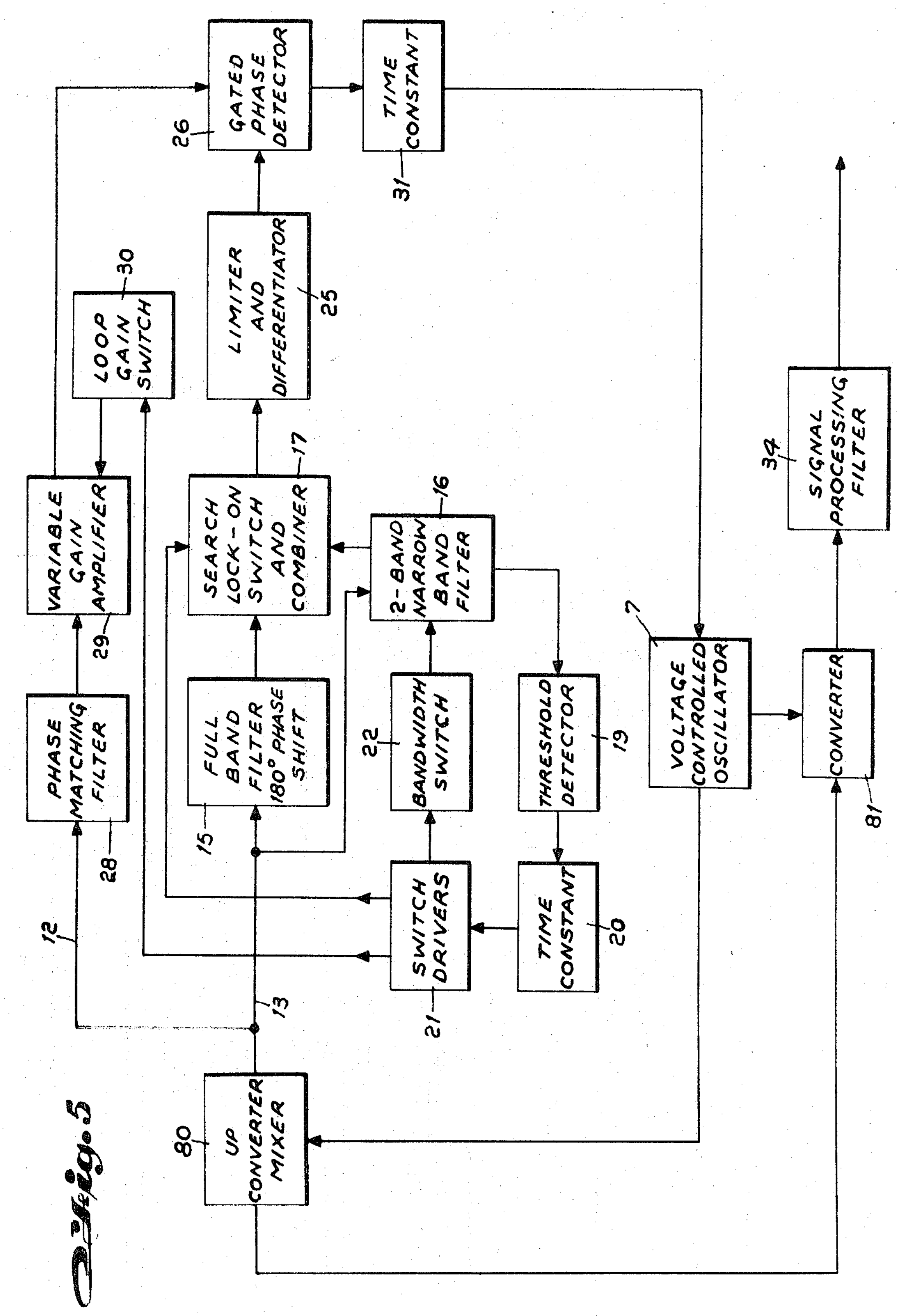
FIG. 5 is a block diagram of a modification of the selection processing circuitry shown in FIG. 1.

Referring now to FIG. 5, a modification of the signal selection circuitry of FIG. 1 is there illustrated. In this figure the numbers applied to the box correspond to those of the corresponding equipment in FIG. 1. The principal change between FIG. 5 and FIG. 1 is that instead of having up and down converters 14 and 23, in FIG. 5 a single converter 80 is arranged in front of the frequency discriminator. This embodiment is applicable where the frequency of the input signals is such that the gated phase detector can operate on the band involved. Thus, for example, if the input signals were low frequency, as in the Omega Navigation System, 80 could be an up converter mixer. Only a single converter 81 is used for the signal processing part of the arrangement of FIG. 5.

We claim:

1. A frequency discriminator arrangement comprising:

- a source of input signals within a specified frequency band;
- a first transmission path coupled to said source for transmission of said input signals therealong;
- a second transmission path coupled to said source for transmission of said input signals therealong;
- a first means disposed in said first path coupled to said source to provide a phase shift additional to any phase shift in said second path, said additional phase shift varying with variations of the frequency of said input signal over said band;
- second means disposed in said first path coupled to said first means responsive to said input signals at the output of said first means for producing at the output of said first path, gating pulses each coinciding with a predetermined portion of a cycle of said input signals at the output of said first means;
- third means coupled to the output of said first and second paths responsive to said gating pulses for transmitting portions of said input signals at the output of said second path which are time coincidental with said gating pulses; and
- fourth means coupled to the output of said third means responsive to said transmitted portions of said input signals for developing an output voltage that varies with variations in the amplitude of said transmitted portions of said input signals.

2. A frequency discriminator arrangement according to claim 1, wherein said first means comprises:

- a broad passband filter having a passband broad enough to cover the entire frequency range of said input signals within said band applied to said first path;
- a narrow passband filter; and
- sixth means coupled to said narrow passband filter responsive to an output signal therefrom above a given threshold level for disconnecting said broad passband filter from said second means and transmitting only the output signal of said narrow passband filter to said second means.

3. A frequency discriminator arrangement according to claim 2, further including

- seventh means disposed in said second path coupled to said source and coupled to said sixth means to reduce the gain in said second path when said broad passband filter is disconnected from said second means.

4. A frequency discriminator arrangement according to claim 1, wherein first means comprises:

- means for producing an additional phase shift that varies over substantially 180° with variations of the frequency of said input signal over said entire band.

5. A frequency discriminator arrangement according to claim 1, wherein said fourth means comprises:

- an integrating network which develops a d.c. voltage determined solely by said transmitted portions of said input signal and independent of any discharge path.

6. A frequency discriminator arrangement according to claim 1, wherein said fourth means comprises:

- an integrating network and said third means is effectively an open circuit across said network between gating pulses.

7. A frequency discriminator arrangement according to claim 1, wherein said second means comprises:

- a differentiator and limiter.

8. A frequency discriminator arrangement according to claim 1, further including

- a voltage controlled oscillator,
- fifth means for applying said output voltage to said voltage controlled oscillator to control the frequency thereof, and
- an up converter disposed in said first path between said source and said first means and coupled to the output of said voltage controlled oscillator.

9. A frequency discriminator arrangement according to claim 1, further including

- a voltage controlled oscillator,
- first means for applying said output voltage to said voltage controlled oscillator to control the frequency thereof,
- an up converter and a down converter disposed in said first path with said first means positioned in said first path between said converters, and
- sixth means coupling said voltage controlled oscillator to said converters.

* * * * *